Sept. 17, 1968      E. B. McWHIRTER      3,401,518

ANTISMOG DEVICE FOR INTERNAL COMBUSTION ENGINE EXHAUST

Filed Sept. 12, 1966

INVENTOR.
EUGENE B. McWHIRTER
BY
Willard S. Gwenn
ATTORNEY

United States Patent Office 3,401,518
Patented Sept. 17, 1968

3,401,518
ANTISMOG DEVICE FOR INTERNAL COMBUSTION ENGINE EXHAUST
Eugene B. McWhirter, 2619 E. Victor Hugo Ave.,
Phoenix, Ariz. 85032
Filed Sept. 12, 1966, Ser. No. 578,708
1 Claim. (Cl. 60—30)

ABSTRACT OF THE DISCLOSURE

An antismog device for oxidizing the exhaust gases immediately after they discharge from the exhaust valve seats into the exhaust manifold by injecting air under pressure from the tips of air tubes exhausting adjacent the discharge side of the valve seats so as to provide a metering effect at the discharge end of the air tubes to cause a swirling of air around the valve seat and underside of the valve head to insure thorough mixing of preheated air and exhaust gases to promote complete combustion of carbon monoxide and unburned hydrocarbons.

---

This invention pertains to antismog devices particularly adapted to the exhaust discharge from internal combustion engines.

One of the objects of this invention is to provide an emission control device for an internal combustion engine exhaust that is highly efficient and effective for all speeds, load and idling conditions of the engine.

Still another object of this invention is to provide an antismog device for automobile exhausts which is highly effective during idling and deceleration and coasting conditions at a time of poor combustion and maximum smog producing discharges from the exhaust.

Still another object of this invention is to provide an auxiliary heat source of high intensity within the exhaust manifold operating in conjunction with compressed air being applied at the exhaust valve seats within the exhaust manifold to control smog producing emissions from the engine.

And an object of this invention is to provide a smog control device for an internal combustion engine which is arranged to at all times maintain the exhaust gas temperatures within the exhaust manifold so that the compressed air presented at the exhaust valve seats and the semioxidized exhausted gases are preheated to a temperature to promote complete combustion of carbon monoxide and unburned hydrocarbons to thereby minimize and eliminate harmful discharges from the exhaust pipe of the engine.

Further features and advantages of this invention will appear from a detailed description of the drawings in which.

Figure 1:
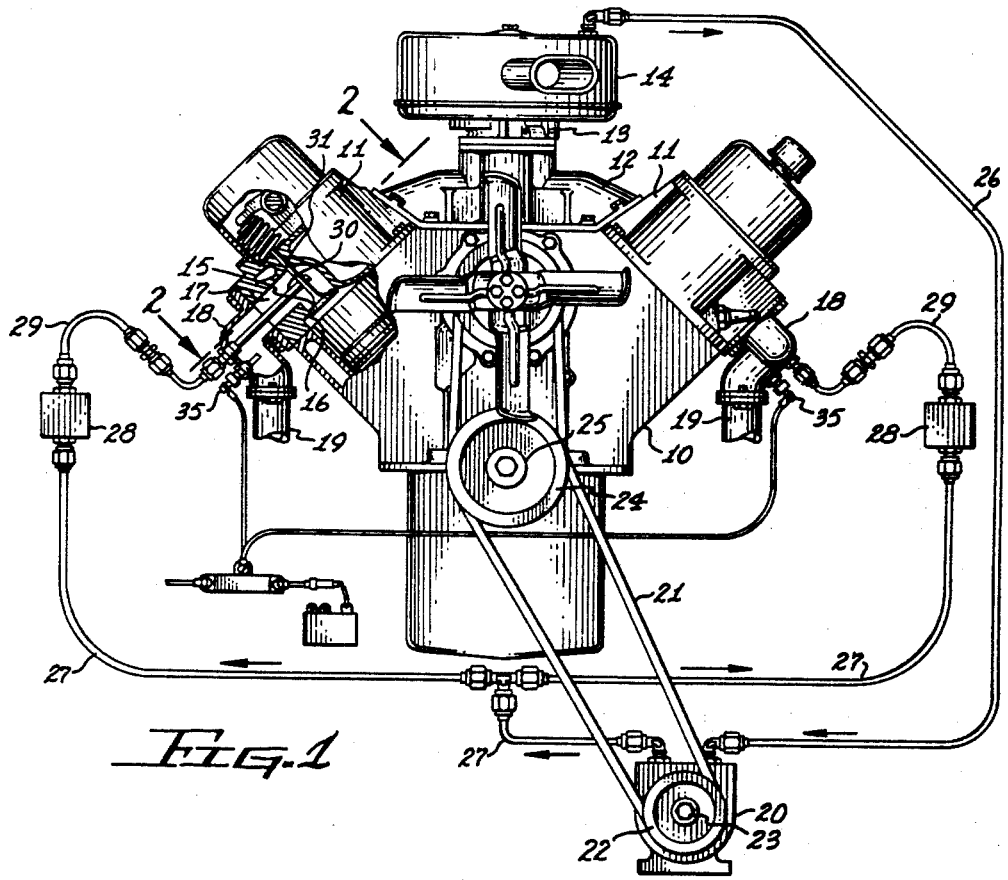
FIG. 1 is a diagramatic view of a typical application of the antismog device for an internal combustion engine incorporating the features of this invention.

As an example of one embodiment of this invention, there is shown a typical V-eight internal combustion for motor vehicles comprising the usual cylinder block 10, the cylinder heads 11, intake manifold 12, carburetor 13, and air cleaner 14. Each cylinder has the exhaust valves 15 which engage the valve seats 16 for intermittent discharge of exhaust gases into the exhaust cavities 17 formed in the cylinder heads 11 which cavities in turn are connected to the exhaust manifolds 18 connected to which is the exhaust pipe 19.

Figures 2, 3:
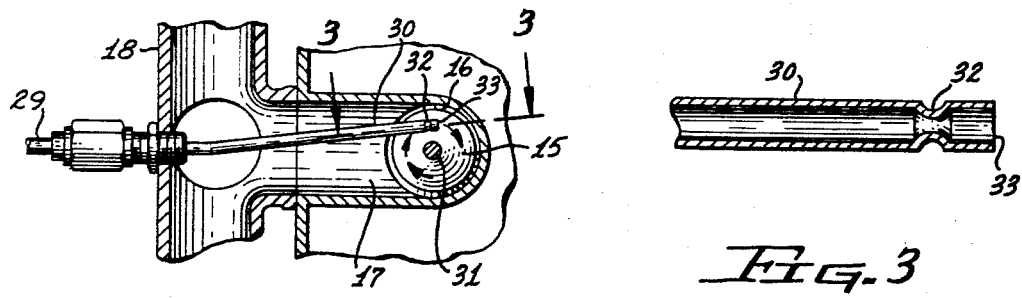
FIG. 2 is an enlarged fragmentary sectional view on the line 2—2 of FIG. 1.
FIG. 3 is an enlarged fragmentary sectional view on the line 3—3 of FIG. 2.

In order to oxidize the exhaust gases immediately as they discharge past the exhaust valve seats at high temperature there is provided a constant displacement air pump 20 which is driven by a suitable belt 21 operating over the pulley 22 on the input shaft 23 and over a suitable pulley 24 fixed on the crankshaft 25 of the engine. Air is drawn by the pump from the carburetor air cleaner 14 through a suction line 26 and is discharged under pressure out through the pressure lines 27 to suitable plenum chamber 28 immediately adjacent the exhaust manifolds 18. From the plenum chambers 28 air pressure is connected through lines 29 to the discharge tubes 30 which extend through the walls of the exhaust manifolds to an area immediately adjacent to each exhaust valve seat just outside the cylinder chambers of the engines and adjacent the valve stems 31. The exhaust gas temperatures at this point are sufficiently high at cruising speeds or accelerating to complete combustion of the elements not burned during the power stroke of the pistons of the engine. Air pressure must be maintained at a predetermined level, preferably at about 4 to 5 pounds per square inch at fifty miles per hour cruising by swaging 32 the tip of the air tubes to provide a metering effect at the discharge end 33 which is so positioned relative to the exhaust valve stem 31 as to cause a swirling of air in that area, FIG. 2, which insures thorough mixing of preheated air and exhaust gases to promote complete combustion of carbon monoxide and unburned hydrocarbons.

In order to overcome the insufficiency of heat to maintain combustion in the exhaust manifold passageways at idle and deceleration conditions of operation of the engine there is provided heating elements 35 which may take the form of suitable electric heaters or glow plugs installed near the lower end of the exhaust manifolds to bring the mixture of air and exhaust gases to combustion temperature before it discharges into the exhaust pipe 19.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claim are intended to be included herein.

Having thus fully set forth and described this invention what is claimed and desired to be obtained by United States Letters patent is:

1. An antismog device for internal combustion engines comprising in combination:
 (a) an exhaust valve,
 (b) an exhaust valve seat including an exhaust valve seat cavity surrounding said valve and arranged to receive the exhaust discharge from said valve seat when said exhaust valve is opened, (c) an exhaust manifold connected to reecive discharge from said exhaust valve seat cavity,
(d) a compressed air injection tube projecting into said exhaust valve seat cavity having a discharge tip located adjacent and to one side of said valve and adjacent the discharge side of said valve seat so as to cause a swirling of air around said valve seat opening,
(e) the discharge tip of the compressed air injection tube being restrictively partly reduced to provide a metering orifice adjacent the discharge end of the tube to cause a swirling of air and exhaust gases to promote complete combustion of carbon monoxide and unburned hydrocarbons in the valve seat cavity.

References Cited

UNITED STATES PATENTS

| | | | |
|---|---|---|---|
| 2,217,241 | 10/1940 | Tendler | 60—30 |
| 3,263,412 | 8/1966 | Thompson | 60—30 |

OTHER REFERENCES

J. M. Chandler et al.: "Development of the Concept of Nonflame Exhaust Gas Reactors," S.A.E. Convention paper presented Mar. 12–16, 1962, pages 3 and 4 are pertinent.

RALPH D. BLAKESLEE, *Primary Examiner.*